No. 624,102. Patented May 2, 1899.
A. C. RUMBLE.
AUTOMATIC JOURNAL OILER AND COOLER.
(Application filed Sept. 2, 1898.)

(No Model.)

Witnesses,

Inventor
Alexander C. Rumble
By Dewey Strong & Co.
Attys.

UNITED STATES PATENT OFFICE.

ALEXANDER C. RUMBLE, OF OAKLAND, CALIFORNIA, ASSIGNOR OF ONE-HALF TO JOSEPH H. THOMPSON, OF SAME PLACE.

AUTOMATIC JOURNAL OILER AND COOLER.

SPECIFICATION forming part of Letters Patent No. 624,102, dated May 2, 1899.

Application filed September 2, 1898. Serial No. 690,091. (No model.)

*To all whom it may concern:*

Be it known that I, ALEXANDER C. RUMBLE, a citizen of the United State, residing in Oakland, county of Alameda, State of California, have invented an Improvement in Automatic Journal Oilers and Coolers; and I hereby declare the following to be a full, clear, and exact description of the same.

My invention relates to a device which is especially designed to supply journals and bearings of all descriptions with lubricant whenever necessary and to prevent the heating of such journals or bearings.

It consists, essentially, of a reservoir suitably located with relation to the bearing and a valve connected therewith and actuated directly by the increase of temperature of the bearing beyond the point of safety, whereby the oil contained in the reservoir is discharged upon the bearing whenever such increase in temperature occurs.

It also comprises details of construction which will be more fully explained by reference to the accompanying drawings, in which—

Figure 1:
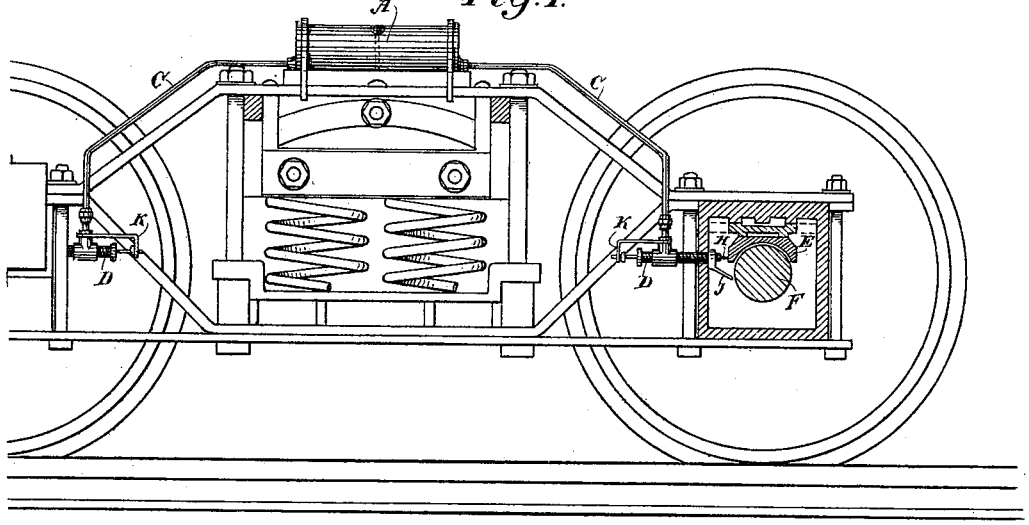
Figure 2:
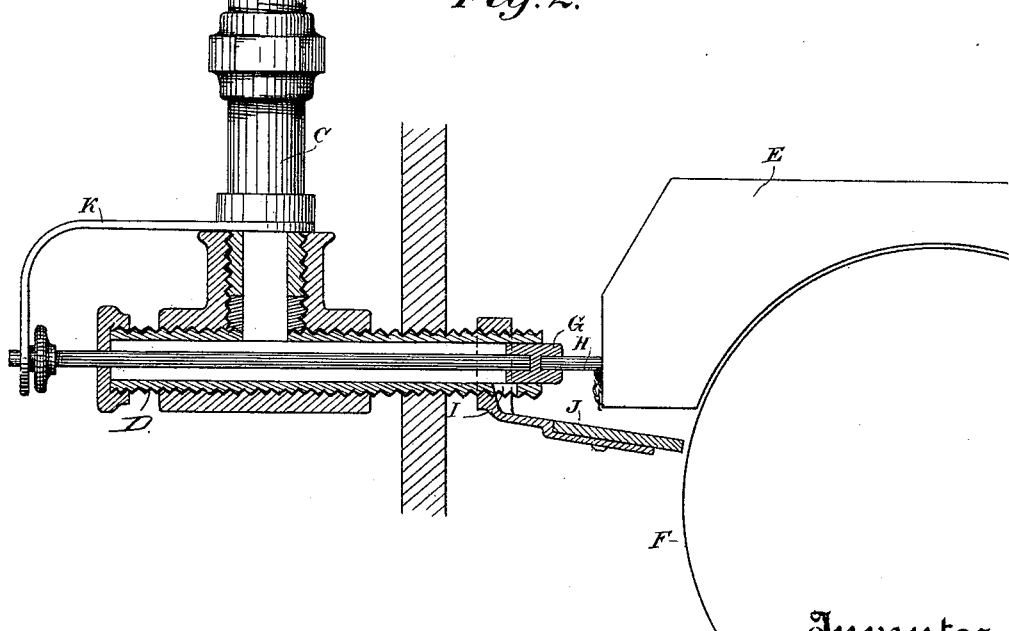

Figure 1 is a general view showing the application of the device to railway-car-axle journal-boxes. Fig. 2 is a longitudinal section of the valve-chamber.

There are many classes of journals and bearings which run at a high rate of speed or under heavy pressure which are liable to become heated by the friction on account of the exhaustion of the lubricant or in some cases by a coating of the contact-surfaces, which will roughen them and prevent a proper lubrication, in which case the temperature of the journal or bearing rapidly rises and if not promptly attended to will soon cause serious trouble by melting or burning out the soft metal or brasses or burning out the packing which is used in certain classes of boxes. Such accidents cause a great deal of delay to cool and repair the boxes, and on railway-trains are almost unavoidable, since a box which shows no sign of heating at one station may be burned out before the next one is reached.

The object of my invention is to prevent such accidents and to automatically supply the journal or bearing boxes with a lubricant whenever it is necessary.

In the present case I have shown the apparatus as applied to the truck of a railway-car; but it will be manifest that it is applicable at any point where there is a journal box or bearing needing such care. As here shown, the oil-reservoir A is mounted at some convenient point upon the truck-frame, and in case of a four-wheeled truck, as at present shown, it is mounted intermediate between the journal-boxes of the wheels. This reservoir may be divided by interior partitions or diaphragms into as many compartments as there are journals to be cared for by the single reservoir. If, as in the present case, the reservoir is fixed near one end of the truck and is intended to take care of two journal-boxes, it is divided into two compartments, each of which contains sufficient oil for one of the journal-boxes. These compartments are connected by pipes or passages C with valve-chambers D, each of which is properly disposed with relation to the journal or bearing which it controls. As here shown, this valve-chamber is tubular and extends through the wall of what is technically known as the "journal-house," with the end in close proximity to the thinnest portion of the brass E, in contact with which the journal F turns. Within this valve-chamber is a spring-pressed plunger-valve G, and connected with or carried by this valve is a projecting stem H of fusible metal, the end of which contacts with the bearing-brass E, as shown, and when thus in contact with the box it pushes the valve back, so as to close the discharge-opening, and it is retained in this condition as long as the bearing is running properly and does not become overheated. The fusible-metal pin H is made of such proportions that it will melt when subjected to a temperature greater than would be safe for the journal. Thus if the oil becomes exhausted from the journal-box or by other reason lubrication is checked or the bearing becomes heated that portion of the brass against which the pin H contacts will soon be raised to a temperature which will melt the pin, and the spring K, pressing upon the stem or valve G, will force the valve forward as the pin melts until the discharge-opening I of the valve-chamber is exposed. The oil or lubricant from the reservoir A then flows through the supply-pipe, the valve-chamber, and the discharge-opening, and by means of a distributer J or other suitable or equivalent device the oil is discharged upon the journal and the journal-box again filled with a lubricant, which will prevent any further heating. Upon the next examination of the box or bearing it will be discovered that the valve has been opened, and it will then only be necessary for the caretaker to place another fusible pin in position, closing the valve, and he again fills the reservoir A, when the device is in condition for further use.

The device is additionally valuable as controlling the lubrication of the journals of railway rolling-stock because it will always act automatically whenever the oil has been exhausted from the box and the temperature begins to rise.

The device is equally applicable to propeller thrust-bearings, steps of vertical shafts, and for electrical generators, motors, and any bearings of like nature.

Having thus described my invention, what I claim as new, and desire to secure by Letters Patent, is—

1. An automatic journal-lubricator including an oil-reservoir, a valve normally closing the oil-outlet, and a fusible pin between the valve and the journal-bearing brass whereby the fusing of the pin allows the valve to uncover the oil-outlet.

2. An automatic oiling or cooling device for journals consisting of a spring-pressed valve, a fusible pin contacting with the brass and adapted to retain the valve normally closed, a reservoir connecting with the valve-chamber so that the fusing of the pin will open the valve and supply the journal-box with oil.

3. The combination with a journal, of a lubricant-supply reservoir connected therewith, a valve controlling the outlet from the reservoir, and a fusible pin carried by the valve and contacting with a part which is liable to become heated whereby the pin maintains the valve normally closed and allows said valve to open when the pin fuses.

In witness whereof I have hereunto set my hand.

ALEXANDER C. RUMBLE.

Witnesses:
S. H. NOURSE,
JESSIE C. BRODIE.